J. L. AUBLE.
CUTTER FOR MOWERS, REAPERS, HARVESTERS, AND THE LIKE.
APPLICATION FILED JUNE 14, 1911.
1,113,944.  Patented Oct. 20, 1914.
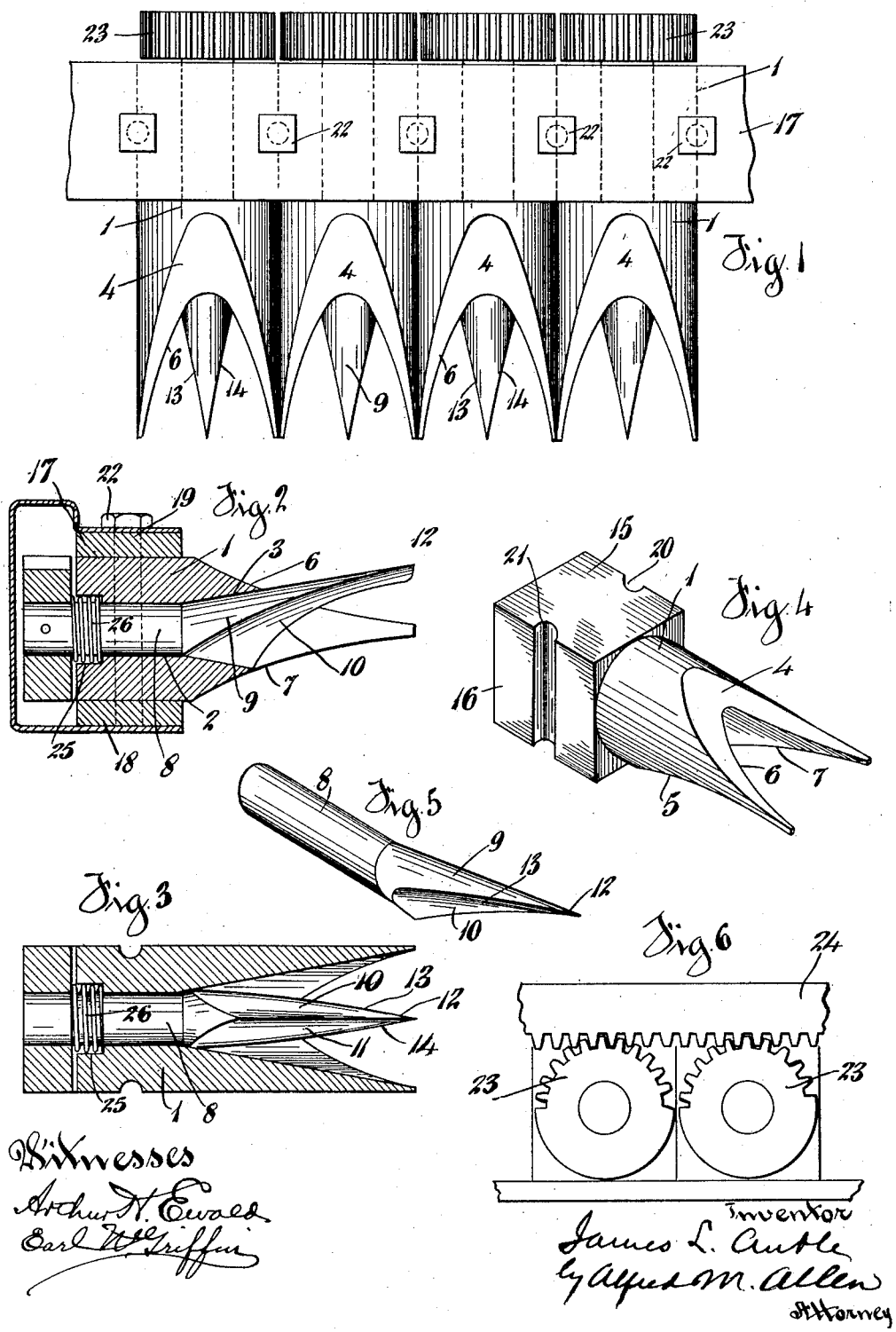

UNITED STATES PATENT OFFICE.

JAMES L. AUBLE, OF CINCINNATI, OHIO, ASSIGNOR OF ONE-HALF TO H. A. BARRETT, OF CINCINNATI, OHIO.

CUTTER FOR MOWERS, REAPERS, HARVESTERS, AND THE LIKE.

1,113,944.      Specification of Letters Patent.      Patented Oct. 20, 1914.

Application filed June 14, 1911. Serial No. 633,168.

*To all whom it may concern:*

Be it known that I, JAMES L. AUBLE, a citizen of the United States, and a resident of the city of Cincinnati, in the county of Hamilton and State of Ohio, have invented a certain novel and useful Cutter for Mowers, Reapers, Harvesters, and the like, of which the following is a full, clear, and exact description, reference being had to the accompanying drawing, forming part of this specification.

The object of my invention is to provide a cutting tooth construction for mowers which shall be strong and durable, readily and easily manufactured, not liable to bend or spring under the strains to which it is subjected, and which shall be self-sharpening and shall automatically take up the wear when in use.

The invention is especially adapted for use in lawn mowers and the like, in which a series of individual cutters or cutting teeth are arranged in a horizontal row and actuated simultaneously in advancing the machine to shift the cutting edge of one member with reference to the cutting edge of the other member to give a shearing cut for the cutters.

The invention consists in providing a tubular, and preferably conical, sheath with a beveled end in connection with a cylindrical or cylindro-conical cutting tooth correspondingly beveled and seated in the sheath, whereby the oscillation or rotation of the one member on the other will present shearing cutting surfaces to the material to be cut.

In the drawing, Figure 1 is a plan view of a portion of a series of the individual cutters as arranged to form the cutter of a lawn mower. Fig. 2 is a central vertical section of one of the individual cutters. Fig. 3 is a central horizontal section of the individual cutter, viewed from the bottom. Fig. 4 is a perspective view of the sheath member. Fig. 5 is a perspective view of the cutting tooth. Fig. 6 is a rear end view of two of the individual cutters as illustrated in Fig. 1.

As illustrated in the drawing, the fixed member of the individual cutter comprises a solid and substantial metallic sheath 1, provided with a central cylindrical bore 2, which bore, for the forward part of the sheath, is preferably flared outwardly to form a conical surface 3. The sheath is also beveled or cut away at 4, 5, for opposite sides, and these beveled cuts are preferably made slightly curved, as shown in Fig. 2. By thus cutting the sheath, curved cutting edges 6, 7, are provided at the forward end of the sheath on the inside.

Seated in the cylindrical and conical socket in the sheath is the cutting tooth, provided with a cylindrical portion 8 and a conical portion 9, corresponding with the conical inner surface of the sheath. This tooth is cut away or beveled at 10, 11, on curved surfaces to a substantially pointed end 12, and straight cutting edges 13, 14, are thus provided for the cutting tooth at the intersections of the curved plane surfaces 10, 11, with the conical surface 9; and it will be evident that by rotating or oscillating one member with reference to the other, the cutting edges 13, 14, of the tooth will provide a shearing cutting surface with the curved cutting edges 6, 7, of the sheath member.

It is not essential in the construction of my improved cutter that a conical recess shall be formed in the sheath, and a correspondingly cone-shaped surface formed for the tooth. The same sort of cutting surfaces will be presented, if a cylindrical recess only is provided, as will be very evident; and while I prefer to provide the conical surfaces, I do not wish to be limited to this construction. The reason for forming a conical seat is that, inasmuch as the pressure on the cutting teeth is from the front as the parts wear, this wear will be taken up. I also prefer to bevel the sheath and tooth with curved surfaces, as this provides a somewhat sharper edge for the cutting edges, but it will be understood that the curved surfaces are not essential, as the same kind of cutting edge could be formed by cutting away the parts on simple plane surfaces.

In order that my improved cutter may be used for a lawn mower, or reaper, and that the series of individual teeth may be readily secured together in close proximity to each other for any width of built-up cutter desired, I prefer to flatten the outer surfaces of the rear portion of the sheath, forming the flat surfaces 15, 16, for the four sides, and the individual cutters are placed together and secured rigidly in position by the plates 17, 18, and bolts 19, which extend between the two plates and preferably pass down through semi-cylindrical grooves 20, 21, in the side faces of the rear portion of each sheath, and the parts are tightly clamped together by the nuts 22.

In order to oscillate or rotate each tooth simultaneously in cutting, the cylindrical portion 8 of each tooth extends to the rear of the sheath 1 and is provided with a segment gear 23, secured thereon, and these segment gears are engaged by a rack bar 24, which, in the progress of the machine, is reciprocated by any convenient mechanism.

In order to take up the wear and hold the cutting edges of the two members of the cutter in contact, I provide a socket 25 in the rear end of each sheath, in which are seated spring washers 26, which bear between the base of the socket and the segment gear.

In the construction as illustrated, it is only intended to oscillate the cutting teeth in the sheaths, and in this construction I prefer to use the upper cutting edge 6 of the sheath member for the cutting edge; but of course, if desired, the lower edge 7 can be used as the cutting edge, or in certain instances the teeth may be rotated, and both edges will then form the cutting edges, and the tooth will cut alternately above and below. As employed in the claims, therefore, the terms "rotary" and "rotating" are used in a generic sense to cover the idea of a complete or partial movement of rotation and such movement in either direction.

My construction of cutter forms a most effective cutting device, in that the coöperating members can be formed stiff and rigid so that the cutting edges cannot spring apart under the strain, and thus allow the grass to wedge in between the cutting surfaces. The angle of the cone surfaces with the axis is formed sufficiently abrupt to prevent the coöperating parts from binding, and at the same time sufficient length of cutting edge can be provided for effective use. The pressure of the material to be cut tends to hold the members in close contact and the wear is taken up by the spring washers, or in any other convenient way.

Having thus described my invention, what I claim as new and desire to secure by Letters Patent, is:—

1. A device of the character specified, comprising a tubular member having a recess therein for a coöperating member and a bevel through its wall to form a longitudinally inclined cutting edge, a coöperating member inclosed in the tubular member and beveled to form a longitudinally inclined cutting edge and means for rotating one member with reference to the other to obtain a shearing cut.

2. A device of the character specified, comprising a tubular member having a conical recess at one end, a conical member to fit in said recess, a longitudinally inclined bevel through the wall of the tubular member, and a corresponding bevel on the conical member to form cutting edges at their ends and means for imparting rotary movement between the members to obtain a shearing cut.

3. A mower comprising a tubular member beveled through its wall on opposite sides toward its forward end to form longitudinal cutting edges where the beveled surfaces intersect the interior surface of the tubular member, a coöperating member fitting within said tubular member, and provided with a tapering cutting edge coöperating with the cutting edges on the tubular member and means for imparting a rotary movement between said coöperating members to obtain a shearing cut.

4. A cutter for mowers, comprising a series of tubular casings, arranged in a horizontal row, with each casing having its projecting end beveled above and below to form a curved recess, and a cutting tooth fitted within said casing having a substantially pointed beveled end, with means for simultaneously imparting a rotary movement between each tooth and its respective casing, for the purpose specified.

5. A cutter for mowers, comprising a series of tubular casings, with outwardly flared conical recesses, arranged in a horizontal row with each casing having its projecting end beveled above and below to form a curved recess, and a cutting tooth fitted within said casing, with the conical surfaces coinciding, and having a substantially pointed beveled end, with means for simultaneously imparting a rotary movement between each tooth and its respective casing, for the purpose specified.

6. A cutter for mowers, comprising a series of fixed tubular casings, arranged in a horizontal row with each casing having its projecting end beveled above and below to form a curved recess, and a rotatable cutting tooth fitted within each casing, having a substantially pointed beveled end, with means for simultaneously imparting a rotary movement to the series of cutting teeth, for the purpose specified.

7. A cutter for mowers, comprising a series of fixed tubular casings, with outwardly flared conical recesses, arranged in a horizontal row, with each casing having its projecting end beveled above and below to form a curved recess, and a rotatable cutting tooth fitted within each casing; with the conical surfaces coinciding and having a substantially pointed beveled end, with means for simultaneously imparting a rotary movement to the series of cutting teeth, for the purpose specified.

JAMES L. AUBLE.

Witnesses:
 FRANK W. KUNKEL,
 EARL W. GRIFFIN.

Copies of this patent may be obtained for five cents each, by addressing the "Commissioner of Patents, Washington, D. C."